(12) United States Patent
Yamazaki et al.

(10) Patent No.: US 7,981,372 B2
(45) Date of Patent: Jul. 19, 2011

(54) OXIDATIVE AUTOTHERMAL REFORMER AND OXIDATIVE AUTOTHERMAL REFORMING METHOD USING THE SAME

(75) Inventors: Yoshinori Yamazaki, Tokyo (JP); Saburo Maruko, Tokyo (JP); Shingo Komori, Tokyo (JP)

(73) Assignees: Japan Energy Corporation, Tokyo (JP); Nippon Chemical Plant Consultant Co., Ltd., Tokyo (JP)

( * ) Notice: Subject to any disclaimer, the term of this patent is extended or adjusted under 35 U.S.C. 154(b) by 386 days.

(21) Appl. No.: 12/086,194

(22) PCT Filed: Nov. 24, 2006

(86) PCT No.: PCT/JP2006/323464
§ 371 (c)(1),
(2), (4) Date: Jun. 6, 2008

(87) PCT Pub. No.: WO2007/066522
PCT Pub. Date: Jun. 14, 2007

(65) Prior Publication Data
US 2009/0158659 A1 Jun. 25, 2009

(30) Foreign Application Priority Data

Dec. 8, 2005 (JP) .................................. 2005-354805

(51) Int. Cl.
*B01J 8/04* (2006.01)
(52) U.S. Cl. ........ 422/188; 422/187; 422/189; 422/190; 422/193; 422/194; 422/196; 422/197; 422/211; 48/61; 48/127.9; 423/652; 423/648.1
(58) Field of Classification Search .......... 422/187–191, 422/197
See application file for complete search history.

(56) References Cited

U.S. PATENT DOCUMENTS
4,861,348 A * 8/1989 Koyama et al. .................. 48/94
(Continued)

FOREIGN PATENT DOCUMENTS
EP 0 361 648 A1 4/1990
(Continued)

OTHER PUBLICATIONS

Suzuki et al., "Steam reforming of Kerosene on Ru/Al$_2$O$_3$ catalyst to yield hydrogen," International Journal of Hydrogen Energy, vol. 25, No. 2, 2000, pp. 119-126.

(Continued)

*Primary Examiner* — Kaity V. Handal
(74) *Attorney, Agent, or Firm* — Oliff & Berridge, PLC

(57) ABSTRACT

An oxidative autothermal reformer including a reforming layer at least partially filled with a reforming catalyst for producing a reformed gas composed mainly of hydrogen through a reforming reaction by contacting a mixture of a hydrocarbon or an aliphatic alcohol and steam with the reforming catalyst; and an oxidative exothermic layer at least partially filled with an oxidation catalyst for generating heat by oxidizing a part of the reformed gas, in which the reforming layer is disposed at an upstream side of the oxidative exothermic layer; the reforming layer and the oxidative exothermic layer are in the form of a cylinder and have a triple circular tube structure formed by disposing an inner reforming layer, an oxidative exothermic layer and an outer reforming layer from the inside in a radial direction in this order; and at least a part of the reforming catalyst filled in the inner reforming layer and the outer reforming layer contains Ru metal.

11 Claims, 3 Drawing Sheets

U.S. PATENT DOCUMENTS

| | | |
|---|---|---|
| 7,270,689 B2 * | 9/2007 | Fujii et al. .................... 48/198.7 |
| 7,563,292 B2 * | 7/2009 | Ahmed et al. .................... 48/61 |
| 2003/0041519 A1 | 3/2003 | Maruko |
| 2003/0074839 A1 | 4/2003 | Maruko |
| 2004/0058230 A1 * | 3/2004 | Hsu ................................ 429/62 |
| 2005/0178064 A1 | 8/2005 | Maruko |

FOREIGN PATENT DOCUMENTS

| | | |
|---|---|---|
| EP | 1 094 030 A2 | 4/2001 |
| JP | A-2001-192201 | 7/2001 |
| JP | 2002211903 * | 7/2002 |
| JP | A-2003-335504 | 11/2003 |
| JP | A-2005-060182 | 3/2005 |
| JP | A-2005-239525 | 9/2005 |
| JP | 2007145637 * | 6/2007 |

OTHER PUBLICATIONS

Fukunaga et al., "Development of kerosene fuel processing system for PEFC," Catalysis Today, vol. 84, 2003, pp. 197-200.

* cited by examiner

US 7,981,372 B2

OXIDATIVE AUTOTHERMAL REFORMER AND OXIDATIVE AUTOTHERMAL REFORMING METHOD USING THE SAME

TECHNICAL FIELD

This invention relates to a reformer for contacting a mixture of a hydrocarbon or an aliphatic alcohol and steam with a reforming catalyst to produce a reformed gas composed mainly of hydrogen through a reforming reaction and a reforming method using the reformer, and more particularly to an oxidative autothermal reformer utilizing heat of oxidation in the reformer for the reforming reaction.

BACKGROUND ART

Heretofore, as a method for producing a reformed gas composed mainly of hydrogen through a reforming reaction by contacting a mixture of a hydrocarbon or an aliphatic alcohol and steam with a catalyst is adopted a steam reforming system wherein heat required for the reforming reaction (endothermic reaction) is given from an exterior through a wall of the reformer as a heat transfer face by means of a combustion burner or the like. In this system, however, for example, when kerosene is steam-reformed, a reforming reaction temperature is required to be about 700-850° C., so that a temperature at the wall of the reformer heated with external heat becomes higher than the reforming reaction temperature, and hence it is necessary to use an expensive material as a material constituting the wall of the reformer. Further, a heating device is required, which has a problem of enlarging the size of the reformer.

To the contrary, there is proposed an autothermal reforming method wherein a mixture of a hydrocarbon or an aliphatic alcohol and steam is further entrained with an oxidizing gas, and a partial oxidation reaction layer is disposed at an upstream side and a steam reforming layer is disposed at a downstream side, and heat generated in the partial oxidation reaction layer of the upstream side is utilized to supplement reforming reaction heat in the steam reforming layer of the downstream side. This method has advantages in which heat loss is small and the reformer can be miniaturized. As a further improved autothermal reforming method are proposed techniques of JP-A-2001-192201, JP-A-2003-335504 and the like.

DISCLOSURE OF THE INVENTION

In the methods described in the above official gazettes, however, the reforming layer and the oxidative exothermic layer are in the form of a rectangular column, so that it is difficult to uniformly flow the mixture of the hydrocarbon or aliphatic alcohol and steam and/or the reformed gas therefrom through the reforming layer and the oxidative exothermic layer and also the temperature at each of the layers tends to be non-uniform. Therefore, there is a problem that the reforming reaction does not evenly progress at the reforming layer, and in particular there are caused many problems when a hydrocarbon having a large carbon number is used as a starting material. Since the reformer is in the form of the rectangular column, the temperature at each catalyst layer also becomes non-uniform, and hence high-temperature and low-temperature portions are partially formed in the wall of the reformer, which also causes a problem in the durability of the reformer due to heat stress therefrom.

It is, therefore, an object of the invention to solve the above-mentioned problems of the conventional techniques and to provide a reformer having a high durability and capable of accomplishing a high reforming efficiency because of a high reaction uniformity in the reforming layer and the oxidative exothermic layer and being particularly suitable for reforming a hydrocarbon-based starting material having a larger carbon number, which was deemed difficult to be reformed, as well as a reforming method using the reformer.

The inventors have made various studies in order to achieve the above objects and discovered that when a mixture of a hydrocarbon or an aliphatic alcohol and steam is contacted with a reforming catalyst to produce a reformed gas composed mainly of hydrogen through a reforming reaction, a reforming layer and an oxidative exothermic layer are made cylindrical and rendered into a triple circular tube structure formed by disposing an inner reforming layer, an oxidative exothermic layer and an outer reforming layer from the inside in a radial direction in this order, whereby the mixture of the hydrocarbon or aliphatic alcohol and steam and a reformed gas thereof are uniformly and easily flowed through the reforming layer and the oxidative exothermic layer, while a heat transfer area is increased to more quickly transfer heat generated in the oxidative exothermic layer to the reforming layer owing to the structure that the reforming layer is divided into two layers (inner reforming layer and outer reforming layer) and the oxidative exothermic layer is sandwiched therebetween, whereby the temperature distribution in the cross-sectional direction of the reforming layer can be made more evenly. Also, it has been found that since the reformer has the triple circular tube structure, partial heat stress is hardly caused to improve the durability of the reformer. Further, it has been found that a high reforming efficiency can be attained by filling the reforming layer with a reforming catalyst containing Ru metal even for a hydrocarbon-based liquid fuel having a larger carbon number which was deemed difficult to reform.

That is, the oxidative autothermal reformer according to the invention comprises:

a reforming layer at least partially filled with a reforming catalyst for producing a reformed gas composed mainly of hydrogen through a reforming reaction by contacting a mixture of a hydrocarbon or an aliphatic alcohol and steam with the reforming catalyst; and an oxidative exothermic layer at least partially filled with an oxidation catalyst for generating heat by oxidizing a part of the reformed gas, in which the reforming layer is disposed at an upstream side of the oxidative exothermic layer;

the reforming layer and the oxidative exothermic layer are in the form of a cylinder and have a triple circular tube structure formed by disposing an inner reforming layer, the oxidative exothermic layer and an outer reforming layer from the inside in a radial direction in this order; and at least a part of the reforming catalyst filled in the inner reforming layer and the outer reforming layer contains Ru metal.

The oxidative autothermal reformer herein means a reformer wherein the reforming reaction as an endothermic reaction and the oxidation reaction as an exothermic reaction are conducted in the reformer and heat generated in the oxidation reaction is utilized for heat required for the reforming reaction. Moreover, the oxidative autothermal reformer according to the invention utilizes the heat generated in the oxidation reaction for the reforming reaction, but may be heated from an exterior.

In the oxidative autothermal reformer according to the invention, it is preferable that a tubular ring provided with a plurality of ports for blowing out an oxidizing gas is disposed in the oxidative exothermic layer as a means for feeding the oxidizing gas to the oxidative exothermic layer. In this case, the oxidizing gas is uniformly diffused into the oxidative exothermic layer, whereby the oxidation reaction in the cross-sectional direction of the oxidative exothermic layer can be easily caused evenly.

In the oxidative autothermal reformer according to the invention, it is preferable that the oxidative exothermic layer is filled with (1) a mixture of an oxidation catalyst and a reforming catalyst, (2) a mixture of an oxidation catalyst and thermally conductive particles, or (3) a mixture of an oxidation catalyst, a reforming catalyst and thermally conductive particles. At this moment, the reforming catalyst in the mixture to be filled in the oxidative exothermic layer is preferable to contain Ni metal and/or Rh metal. Furthermore, a volume ratio of the reforming catalyst to the oxidation catalyst in the mixture to be filled in the oxidative exothermic layer is preferable to be not less than 4 but not more than 40, and a volume ratio of the thermally conductive particles to the oxidation catalyst in the mixture to be filled in the oxidative exothermic layer is preferable to be not less than 4 but not more than 40.

In another preferable embodiment of the oxidative autothermal reformer according to the invention, the oxidative exothermic layer is comprised of a portion at least containing the oxidation catalyst and a portion at least containing thermally conductive particles, and the portion at least containing the oxidation catalyst is disposed at an upstream side of the portion at least containing the thermally conductive particles.

Also, the oxidative autothermal reforming method according to the invention comprises feeding a mixture of a hydrocarbon or an aliphatic alcohol and steam to the inner reforming layer and the outer reforming layer in the above-described oxidative autothermal reformer to produce a reformed gas composed mainly of hydrogen through a reforming reaction, and then feeding the reformed gas to the oxidative exothermic layer in the above-described oxidative autothermal reformer to oxidize a part of the reformed gas to thereby generate heat.

The oxidative autothermal reforming method herein means a reforming method wherein the reforming reaction as an endothermic reaction and the oxidation reaction as an exothermic reaction are simultaneously conducted and heat generated in the oxidation reaction is utilized for heat required for the reforming reaction. Moreover, the oxidative autothermal reforming method according to the invention utilizes the heat generated in the oxidation reaction for the reforming reaction, but may further comprise heating from an exterior.

In a preferable embodiment of the oxidative autothermal reforming method according to the invention, a mixture containing an oxidation catalyst and a reforming catalyst is filled into the oxidative exothermic layer, the mixture of the hydrocarbon or aliphatic alcohol and steam is fed to the inner reforming layer and the outer reforming layer to produce the reformed gas composed mainly of hydrogen through the reforming reaction, and then the reformed gas is fed to the oxidative exothermic layer to oxidize a part of the reformed gas to generate heat with further promoting the reforming of the reformed gas. When the reforming reaction is conducted only in the inner reforming layer and the outer reforming layer, an amount of methane and/or a component having a carbon number of not less than 2 (C2+ component) retaining in the reformed gas may be large. In the latter method, however, the reforming reaction can be promoted even in the oxidative exothermic layer, and hence the amount of methane and/or the C2+ component retaining in the reformed gas can be further reduced to increase a total amount of the resulting hydrogen.

In the other preferable embodiment of the oxidative autothermal reforming method according to the invention, a thermal self-sustainability is accomplished by compensating heat required for the reforming reaction in the inner reforming layer and the outer reforming layer with the heat generated in the oxidative exothermic layer. It is also preferable that the oxidative exothermic layer is comprised of a portion at least containing the oxidation catalyst and a portion at least containing thermally conductive particles disposed at a downstream side of the portion containing the oxidation catalyst, and heat generated at the portion at least containing the oxidation catalyst in the oxidative exothermic layer is transferred to the portion at least containing the thermally conductive particles in the oxidative exothermic layer, and the heat is further transferred from the portion containing the thermally conductive particles to the inner reforming layer and the outer reforming layer.

In a further preferable embodiment of the oxidative autothermal reforming method according to the invention, the mixture of the hydrocarbon or aliphatic alcohol and steam is a mixture of steam and at least one selected from the group consisting of gas oil, naphtha, kerosene and gasoline.

According to the invention, the mixture of the hydrocarbon or aliphatic alcohol and steam and the reformed gas thereof can be uniformly flowed through the reforming layer and the oxidative exothermic layer by rendering the reforming layer and the oxidative exothermic layer into the form of the cylinder, and further the reforming reaction can be promoted uniformly.

Also, the heat transfer area can be enlarged to more quickly transfer the heat generated in the oxidative exothermic layer to the reforming layer by dividing the reforming layer into two layers (the inner reforming layer and the outer reforming layer) and sandwiching the oxidative exothermic layer therebetween, and thereby the temperature distribution in a cross-sectional direction of the reforming layer can be made more uniform.

Further, since the reformer has the triple circular tube structure, the partial heat stress can be hardly caused to improve the durability of the reformer.

Moreover, the reforming efficiency of the liquid fuel can be improved by filling the inner reforming layer and the outer reforming layer with the reforming catalyst containing Ru metal. Although the reforming catalyst containing Ru metal is commonly low in the oxidation resistance, the oxidizing gas is not fed into the inner reforming layer and the outer reforming layer in the invention, so that it is not necessary to take account of the oxidation resistance of the catalyst and the Ru-supported catalyst can be preferably used.

BEST MODE FOR CARRYING OUT THE INVENTION

Figure 1:
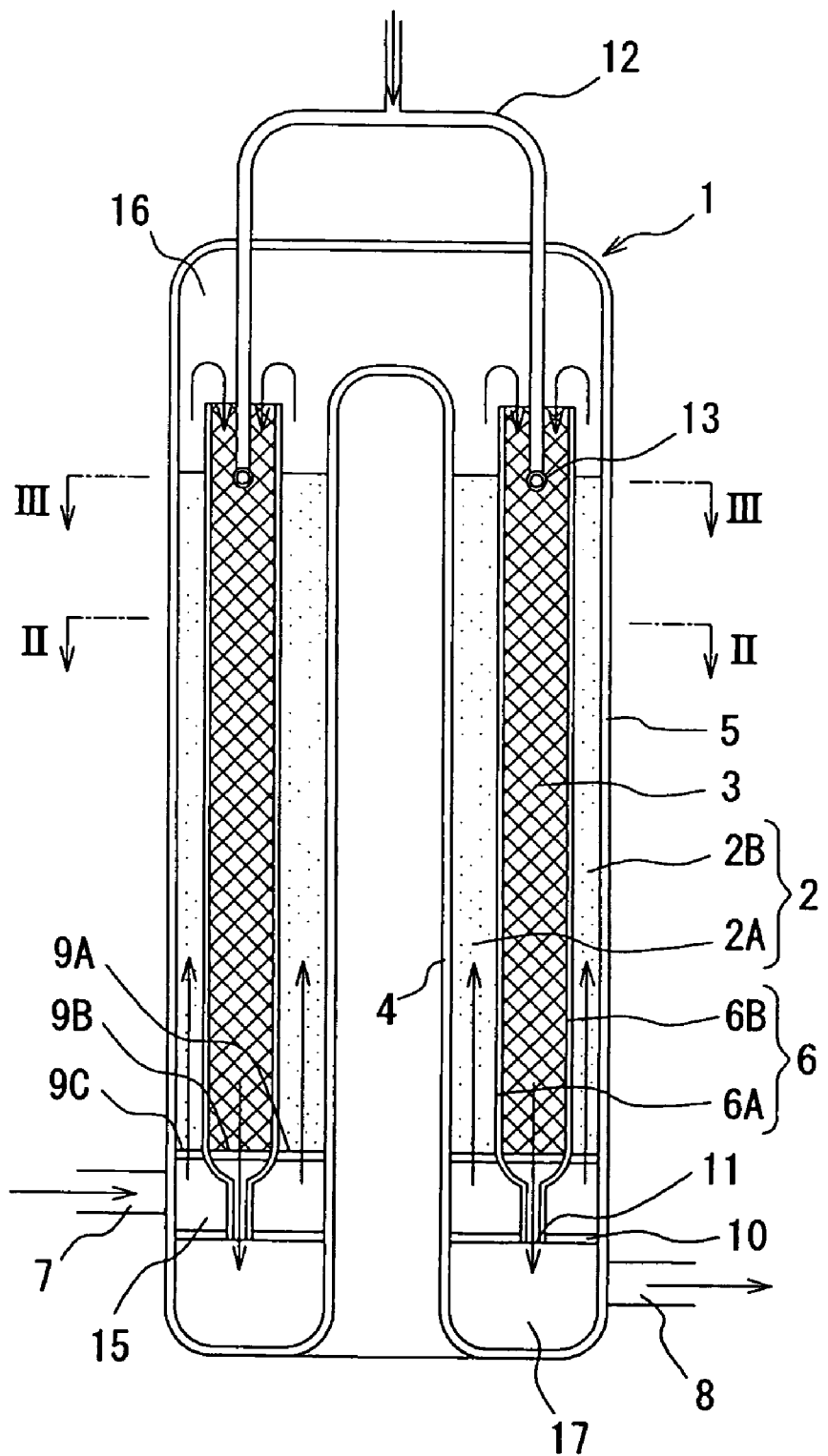
FIG. 1 is a schematic cross-sectional side view showing an embodiment of the oxidative autothermal reformer according to the invention.
Figure 2:
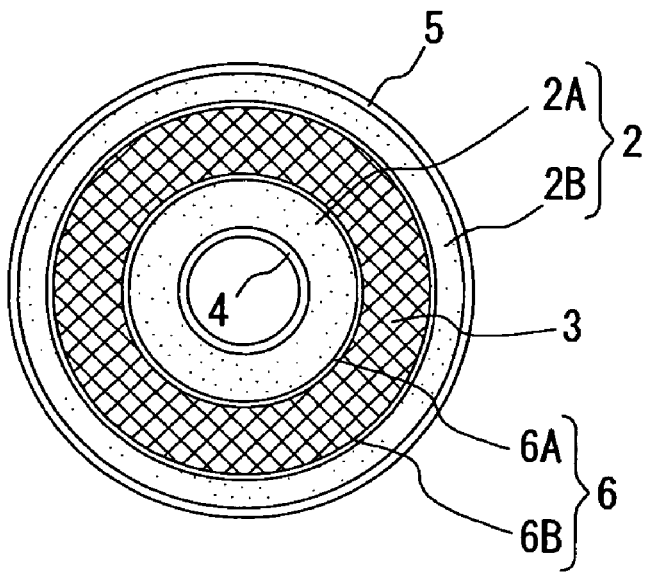
FIG. 2 is a cross-sectional view taken along a line II-II in FIG. 1.
Figure 3:
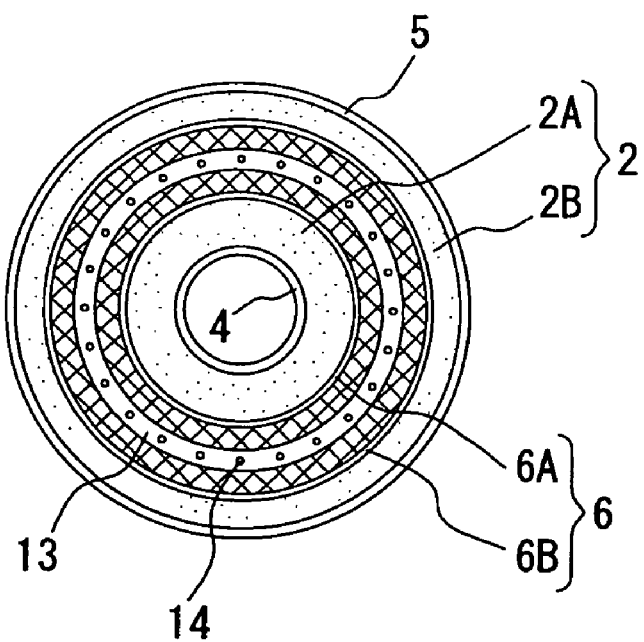
FIG. 3 is a cross-sectional view taken along a line III-III in FIG. 1.
Figure 4:
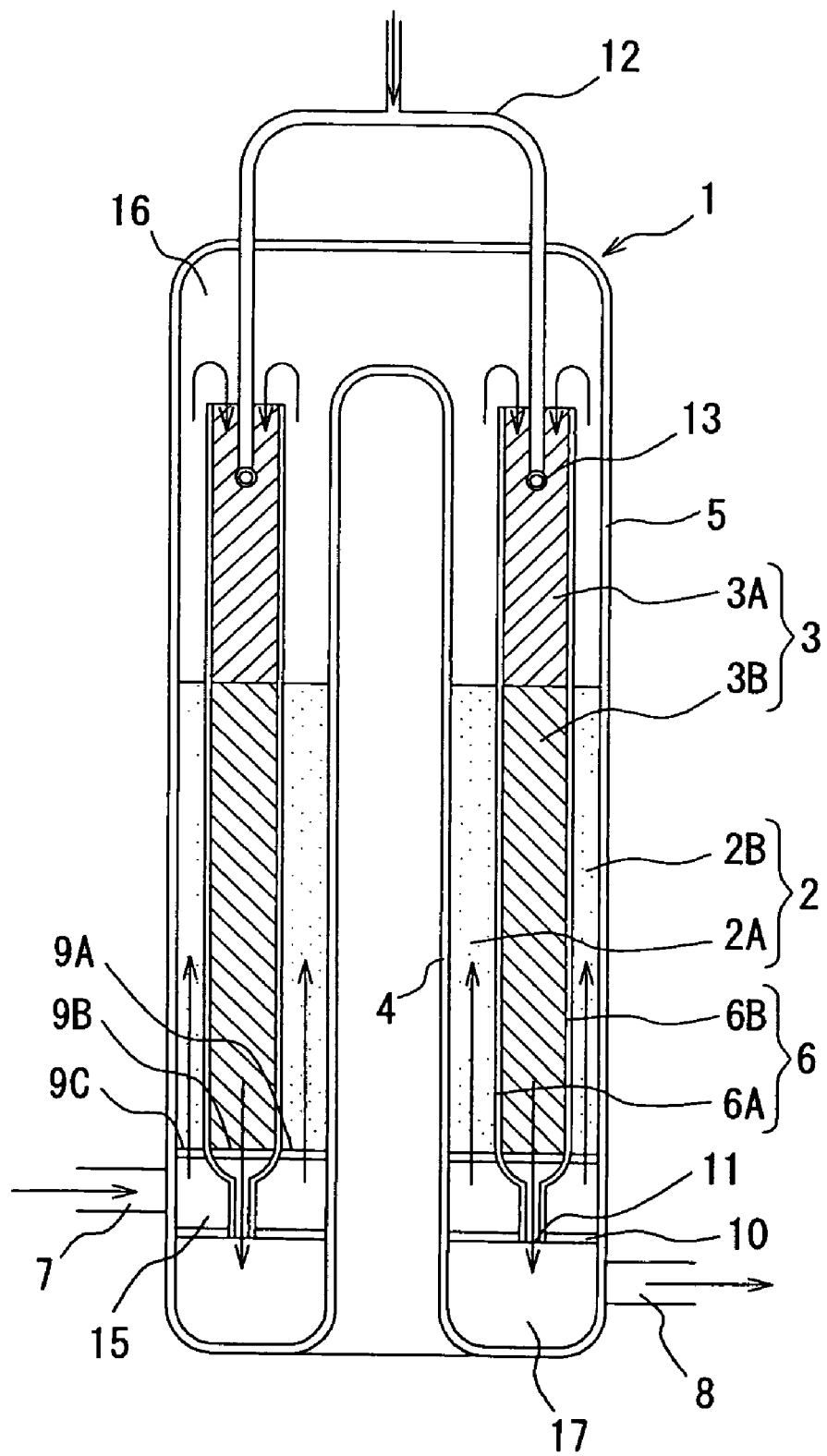
FIG. 4 is a schematic cross-sectional side view showing another embodiment of the oxidative autothermal reformer according to the invention.

An embodiment of the invention will be described in detail below with reference to the attached drawings. FIG. 1 is a schematic view of an embodiment of the oxidative autothermal reformer according to the invention, and FIG. 2 is a cross-sectional view taken along a line II-II in FIG. 1, and FIG. 3 is a cross-sectional view taken along a line III-III in FIG. 1, and FIG. 4 is a schematic view of another embodiment of the oxidative autothermal reformer according to the invention. The oxidative autothermal reformer has a cylindrical form as a whole, and each of elements is formed circularly and disposed concentrically.

The illustrated oxidative autothermal reformer 1 comprises a reforming layer 2 and an oxidative exothermic layer 3 wherein the reforming layer 2 is positioned at an upstream side of the oxidative exothermic layer 3. The reforming layer 2 and the oxidative exothermic layer 3 have the cylindrical form, respectively, and the reforming layer 2 is comprised of two layers of an inner reforming layer 2A located inside in a radial direction and an outer reforming layer 2B located outside in a radial direction, and the oxidative exothermic layer 3 is disposed between the inner reforming layer 2A and the outer reforming layer 2B. They form a triple circular tube structure wherein the inner reforming layer 2A, the oxidative exothermic layer 3 and the outer reforming layer 2B are disposed sequentially from the inside in the radial direction.

The reforming layer 2 and the oxidative exothermic layer 3 are separated by an inner cylinder 4 and an outer cylinder 5 of the oxidative autothermal reformer 1 and two tubular partition walls 6 located between the inner cylinder 4 and the outer cylinder 5 (a radially inner partition wall 6A and a radially outer partition wall 6B), in which a space between the inner cylinder 4 and the radially inner partition wall 6A forms the inner reforming layer 2A and a space between the radially inner partition wall 6A and the radially outer partition wall 6B forms the oxidative exothermic layer 3 and located outside in a radial direction and a space between the radially outer partition wall 6B and the outer cylinder 5 forms the outer reforming layer 2B. As shown in detail in FIG. 2, the inner cylinder 4, the radially inner partition wall 6A, the radially outer partition wall 6B and the outer cylinder 5 are annularly and concentrically disposed to form a fourfold circular tube structure, and the inner reforming layer 2A, the oxidative exothermic layer 3 and the outer reforming layer 2B located therebetween respectively form the triple circular tube structure.

In the illustrated oxidative autothermal reformer 1, the lower portion of the outer cylinder 5 is further connected with a starting material-introducing tube 7 for feeding the starting material into both of the inner reforming layer 2A and the outer reforming layer 2B and a reformed gas-discharging tube 8 for discharging the reformed gas from the oxidative exothermic layer 3. Above a position connected to the starting material-introducing tube 7, compartment supports 9A, 9B and 9C are disposed at lower portions of the inner reforming layer 2A, the oxidative exothermic layer 3 and the outer reforming layer 2B, respectively. These compartment supports 9A, 9B and 9C prevent the falling down of the catalyst and the like filled in each of these layers and allow to pass the mixture of the hydrocarbon or aliphatic alcohol and steam and the reformed gas. Also, a partition wall 10 is arranged below the position connected to the starting material-introducing tube 7 and above the position connected to the reformed gas-discharging tube 8, and an opening 11 communicating with the oxidative exothermic layer 3 is formed in the partition wall 10.

The illustrated oxidative autothermal reformer 1 further comprises an oxidizing gas-introducing tube 12 passing through an upper end portion of the outer cylinder 5 and extending to the oxidative exothermic layer 3, and a tubular ring 13 disposed on a tip of the oxidizing gas-introducing tube 12. Moreover, the tubular ring 13 is provided with a plurality of ports 14 for blowing out an oxidizing gas as shown in FIG. 3.

In the invention, the mixture of the hydrocarbon or aliphatic alcohol and steam is first contacted with the reforming catalyst filled in the inner reforming layer 2A and the outer reforming layer 2B to produce a reformed gas composed mainly of hydrogen through the reforming reaction. The hydrocarbon and aliphatic alcohol as a starting material are not particularly limited, and as the hydrocarbon may be used gases such as methane, ethane, propane, butane and the like and liquid fuels such as gas oil, gasoline, naphtha, kerosene and the like, while as the aliphatic alcohol may be used methanol, ethanol and the like. Among them, the reformer according to the invention is suitable for reforming a hydrocarbon having a large carbon number, i.e. gas oil, gasoline, naphtha and kerosene, and is particularly suitable for reforming kerosene.

The hydrocarbon or aliphatic alcohol as a starting material for the reforming is mixed with steam and then introduced into the oxidative autothermal reformer 1 through the starting material-introducing tube 7. In this case, the mixture of the hydrocarbon or aliphatic alcohol as a starting material for the reforming and the steam is preferably introduced into the oxidative autothermal reformer 1 at a vaporized state. If necessary, a heating means (not shown) may be disposed at an upstream side of the starting material-introducing tube 7. A mixing ratio of the steam to the hydrocarbon or aliphatic alcohol as a starting material for the reforming can be properly selected, but is typically within a range of $H_2O/C$ (steam/carbon)=2-4.

In FIG. 1, the steam-containing staring material for the reforming introduced into a starting material gas channel 15 through the starting material-introducing tube 7 passes through the compartment supports 9A and 9C and uniformly flows upward in the inner reforming layer 2A and the outer reforming layer 2B, during which it is reformed into a reformed gas composed mainly of hydrogen. At this moment, sensible heat from the oxidative heat generation caused in the oxidative exothermic layer 3 is transferred via the partition walls 6A and 6B to the inner reforming layer 2A and the outer reforming layer 2B neighboring the partition walls 6A and 6B to cover heat required for the reforming. In addition to the use of the heat generated through the oxidation reaction for the reforming reaction, a part of the heat required for the reforming reaction may be supplied from an exterior in the invention, but it is preferable that a thermal self-sustainability is accomplished by compensating the heat required for the reforming reaction in the reforming layer with the heat generated in the oxidative exothermic layer (i.e. the reaction is promoted by only the heat generated internally without supplying the heat from the exterior).

In the invention, at least a part of the reforming catalyst to be filled in the inner reforming layer 2A and the outer reforming layer 2B is required to contain Ru metal. The Ru metal-containing reforming catalyst is excellent in the reforming performance of the liquid fuel having a large carbon number and can improve the reforming efficiency thereof. Concretely, it is suitable for reforming gas oil, gasoline, naphtha and kerosene, and is particularly preferable for reforming kerosene. Although the Ru-supported catalyst is commonly low in the oxidation resistance, since the inner reforming layer 2A and the outer reforming layer 2B are disposed at the upstream side of the oxidative exothermic layer 3 and the oxidizing gas is not fed into the inner reforming layer 2A and the outer reforming layer 2B according to the invention, it is not necessary to take account of the oxidation resistance of the catalyst, and hence the Ru-supported catalyst can be used in the invention. The Ru metal-containing reforming catalyst can be prepared by supporting Ru alone or Ru with another metal such as Ni, W, Rh, Pt or the like on a carrier such as alumina, silica, zirconia or the like. In the invention, it is sufficient that at least a part of the reforming catalyst filled in the inner reforming layer 2A and the outer reforming layer 2B contains Ru metal, but the Ru metal-containing reforming catalyst may be mixed with a reforming catalyst containing no Ru metal and filled into the inner reforming layer 2A and the outer reforming layer 2B. As the other reforming catalyst which may be used with the Ru metal-containing reforming catalyst may be used a catalyst formed by supporting one or more of Ni, W, Rh, Pt and the like on a carrier such as alumina, silica, zirconia or the like. The reforming catalysts used in the inner reforming layer 2A and the outer reforming layer 2B may be same or different.

The space velocity LHSV (Liquid Hourly Space Velocity) in the inner reforming layer 2A and the outer reforming layer 2B differs in accordance with the kind of the starting material for the reforming, but it is commonly preferable that LHSV is about $0.1-1.0\ h^{-1}$. Also, the temperature in the inner reforming layer 2A and the outer reforming layer 2B is dependent on the kind of the starting material for the reforming, the operating conditions and the like, but is typically maintained to be about 400° C. to 700° C., for example, when the starting material for the reforming is kerosene.

The starting material for the reforming introduced into the oxidative autothermal reformer 1 as described above is partially or completely reformed in the inner reforming layer 2A and the outer reforming layer 2B to form a reformed gas composed mainly of hydrogen, which enters into a reformed gas channel 16. At this time, the conversion to C1 may depend on the kind of the starting material for the reforming and the operating conditions, but is typically not less than 90%.

Further, the reformed gas returns to a downward flowing direction and enters into the oxidative exothermic layer 3. To the oxidative exothermic layer 3 is connected the oxidizing gas-introducing tube 12 as a means for feeding the oxidizing gas, and the tubular ring 13 having the plural ports 14 for blowing out the oxidizing gas is preferably disposed on a tip of the oxidizing gas-introducing tube 12. In the illustrated example, the oxidizing gas for oxidizing a part of the reformed gas to generate heat passes through the oxidizing gas-introducing tube 12 and is blown out from the plural oxidizing gas blowout ports 14 in the tubular ring 13. At this moment, the oxidizing gas is blown out from the plural oxidizing gas blowout ports 14 and more uniformly diffused into the oxidative exothermic layer 3 to uniformly progress the oxidation reaction of the reformed gas, so that it is possible to decrease the temperature irregularity in a cross-sectional direction of the oxidative exothermic layer 3. As the kind of the oxidizing gas is commonly used air in view of cost, but it is preferable to use pure oxygen.

In the oxidative exothermic layer 3, it is necessary to conduct the oxidation reaction (exothermic reaction) between hydrogen, methane or the like in the reformed gas introduced into the oxidative exothermic layer 3 and the oxidizing gas in order to compensate the endotherm at the inner reforming layer 2A and the outer reforming layer 2B. The oxidation reaction is promoted by the oxidation catalyst. In the reformer according to the invention, the inner reforming layer 2A, the oxidative exothermic layer 3 and the outer reforming layer 2B are disposed sequentially from the inside in the radial direction, so that heat generated in the oxidative exothermic layer 3 is quickly transferred to the inner reforming layer 2A and the outer reforming layer 2B through the partition walls 6A and 6B.

Firstly, the oxidative exothermic layer 3 may be filled with the mixture of the oxidation catalyst and the reforming catalyst. The reforming catalyst used in the oxidative exothermic layer 3 serves to further promote the reforming of methane and/or C2+ components (components having a carbon number of not less than 2) remaining in the reformed gas introduced into the oxidative exothermic layer 3. The endotherm due to the latter reforming is directly compensated with heat generated from the oxidation reaction promoted by the oxidation catalyst mixed, which creates such a condition that the reforming and the oxidation seem to simultaneously progress.

Secondly, the oxidative exothermic layer 3 may be filled with the mixture of the oxidation catalyst and the thermally conductive particles. The oxidative exothermic layer 3 tends to have a highest temperature in the vicinity just beneath the port for blowing out the oxidizing gas, i.e. in the vicinity just beneath the tubular ring 13 for blowing out the oxidizing gas in the illustrated example, and the temperature becomes lower toward the downstream. Therefore, the difference in temperature between the upstream side and the downstream side in the oxidative exothermic layer 3 can be decreased by partially using the thermally conductive particles in the oxidative exothermic layer 3. The thermally conductive particles serve for transferring heat generated through the oxidation reaction to the whole of the oxidative exothermic layer 3, which increases an amount of heat transfer though the tubular partition walls 6A and 6B at the upstream sides of the inner reforming layer 2A and the outer reforming layer 2B adjoining to the oxidative exothermic layer 3, and hence it is possible to make small the difference in temperature between the upstream and the downstream in the inner reforming layer 2A and the outer reforming layer 2B.

Thirdly, the oxidative exothermic layer 3 may be filled with the mixture of the oxidation catalyst, the reforming catalyst and the thermally conductive particles. In this case, the oxidative exothermic layer 3 simultaneously develops the effects in the above-mentioned first and second cases.

When the thermally conductive particles are used in the oxidative exothermic layer 3, as shown in FIG. 4, it is also possible that the oxidative exothermic layer 3 is divided into two zones of an oxidation catalyst-containing portion 3A and a thermally conductive particle-containing portion 3B wherein the oxidation catalyst-containing portion 3A is disposed at an upstream side of the thermally conductive particle-containing portion 3B. In this case, heat is generated through the oxidation reaction in the oxidation catalyst-containing portion 3A located at the upstream side and transported to the thermally conductive particle-containing portion 3B located at the downstream side together with the reformed gas to transfer to the whole of the thermally conductive particles. The heat transferred to the thermally conductive particles is transferred to the inner reforming layer 2A and the outer reforming layer 2B through the tubular partition walls 6A and 6B, so that it becomes easy to transfer the heat to the upstream sides of the inner reforming layer 2A and the outer reforming layer 2B.

As the oxidation catalyst used in the oxidative exothermic layer 3 is preferable a catalyst supporting Pt, Pd or the like which is hardly deteriorated at a high temperature. The amount of the oxidation catalyst added is preferable to be not less than the amount required for compensating the endotherm due to the reforming and accomplishing the thermal self-sustainability and completely reacting the oxidizing gas, and it is preferable that under LHSV=2-40 $h^{-1}$ of the oxidation catalyst based on the starting material for the reforming, the volume ratio of the reforming catalyst to the oxidation catalyst is not less than 4 but not more than 40 and the volume ratio of the thermally conductive particles to the oxidation catalyst is not less than 4 but not more than 40.

As the reforming catalyst used in the oxidative exothermic layer 3 may be used the reforming catalyst used in the inner reforming layer 2A and the outer reforming layer 2B, but a catalyst supporting one or both of Ni and Rh is preferable because the oxidative exothermic layer 3 is under an oxidizing atmosphere. The latter catalyst can be prepared by supporting Ni or Rh or both on a carrier such as alumina, silica, zirconia or the like.

The material of the thermally conductive particles used in the oxidative exothermic layer 3 is not particularly defined, but is preferable to have a high thermal conductivity, and porous silicon carbide particles are preferable.

The setting position of the tubular ring 13 for blowing out the oxidizing gas is preferably a relatively upper portion in the oxidative exothermic layer 3 but not particularly limited, and is preferably a position higher than the inner reforming layer 2A and the outer reforming layer 2B as shown in FIG. 4 considering the directions of the gas flow and the heat transfer. The mixtures filling the upper and lower portions of the tubular ring 13 for blowing out the oxidizing gas may be same or different.

The amount of the oxidizing gas supplied from the tubular ring 13 for blowing out the oxidizing gas to the oxidative exothermic layer 3 is dependent on the kind of the starting material for the reforming, but it is preferable to be a ratio of oxygen/carbon ($O_2$/C)=about 0.1-0.6, preferably about 0.2-0.6. Thus, the maximum temperature of the oxidative exothermic layer 3 becomes about 550-850° C., preferably about 650-850° C. Therefore, it is not necessary to use a particularly expensive material in the oxidative autothermal reformer according to the invention.

The reformed gas wherein the oxidation and the optional reforming are partially promoted in the oxidative exothermic layer 3 passes through the compartment support 9B, and is guided to a reformed gas channel 17 and then discharged from the reformed gas-discharging tube 8. The reformed gas discharged usually contains carbon monoxide with hydrogen and carbon dioxide. When such a reformed gas is used as a fuel for power generation in a solid oxide fuel cell (SOFC), it can be supplied to the solid oxide fuel cell as it is without removing or converting the carbon monoxide, so that a shift reaction layer is not required to be disposed at a downstream side of the oxidative exothermic layer 3.

In the examples shown in FIGS. 1-4, the starting material gas is introduced from the lower portion of the reformer and the reformed gas is discharged from the lower portion of the reformer, but the reformer according to the invention is not limited thereto and may have, for example, a construction that the starting material gas is introduced from the upper portion of the reformer and the reformed gas is discharged from the upper portion of the reformer.

The invention claimed is:

1. An oxidative autothermal reformer comprising a reforming layer at least partially filled with a reforming catalyst for producing a reformed gas composed mainly of hydrogen through a reforming reaction by contacting a mixture of a hydrocarbon or an aliphatic alcohol and steam with the reforming catalyst; and an oxidative exothermic layer at least partially filled with an oxidation catalyst for generating heat by oxidizing a part of the reformed gas, in which the reforming layer is disposed at an upstream side of the oxidative exothermic layer;
the reforming layer and the oxidative exothermic layer are in the form of a cylinder and have a triple circular tube structure formed by disposing an inner reforming layer, the oxidative exothermic layer and an outer reforming layer from the inside in a radial direction in this order;
at least a part of the reforming catalyst filled in the inner reforming layer and the outer reforming layer contains Ru metal;
the oxidative exothermic layer is filled with a mixture of the oxidation catalyst and the reforming catalyst; and
the reforming catalyst in the mixture filled in the oxidative exothermic layer contains Ni metal and/or Rh metal.

2. An oxidative autothermal reformer according to claim 1, wherein a tubular ring provided with a plurality of ports for blowing out an oxidizing gas is disposed in the oxidative exothermic layer as a means for feeding the oxidizing gas to the oxidative exothermic layer.

3. An oxidative autothermal reformer according to claim 2, wherein a volume ratio of the thermally conductive particles to the oxidation catalyst in the mixture filled in the oxidative exothermic layer is not less than 4 but not more than 40.

4. An oxidative autothermal reformer according to claim 1, wherein the oxidative exothermic layer is filled with a mixture of the oxidation catalyst, the reforming catalyst and thermally conductive particles.

5. An oxidative autothermal reformer according to claim 1 wherein a volume ratio of the reforming catalyst to the oxidation catalyst in the mixture filled in the oxidative exothermic layer is not less than 4 but not more than 40.

6. An oxidative autothermal reformer according to claim 1, wherein the oxidative exothermic layer is comprised of a portion at least containing the oxidation catalyst and a portion at least containing the thermally conductive particles, and the portion at least containing the oxidation catalyst is disposed at an upstream side of the portion at least containing the thermally conductive particles.

7. An oxidative autothermal reforming method, which comprises:
feeding a mixture of a hydrocarbon or an aliphatic alcohol and steam to an inner reforming layer and an outer reforming layer of an oxidative autothermal reformer as claimed in claim 1 to produce a reformed gas composed mainly of hydrogen through a reforming reaction; and
then feeding the reformed gas to an oxidative exothermic layer of the oxidative autothermal reformer to generate heat by oxidizing a part of the reformed gas.

8. An oxidative autothermal reforming method according to claim 7, wherein a mixture containing an oxidation catalyst and a reforming catalyst is filled into the oxidative exothermic layer,
the mixture of the hydrocarbon or aliphatic alcohol and steam is fed to the inner reforming layer and the outer reforming layer to produce the reformed gas composed mainly of hydrogen through the reforming reaction, and then the reformed gas is fed to the oxidative exothermic layer to oxidize a part of the reformed gas to generate heat with further promoting the reforming of the reformed gas.

9. An oxidative autothermal reforming method according to claim 7, wherein a thermal self-sustainability is accomplished by compensating heat required for the reforming reaction in the inner reforming layer and the outer reforming layer with heat generated in the oxidative exothermic layer.

10. An oxidative autothermal reforming method according to claim 9, wherein the oxidative exothermic layer is comprised of a portion at least containing the oxidation catalyst and a portion at least containing thermally conductive particles disposed at a downstream side of the portion containing the oxidation catalyst, the method further comprising transferring heat generated at the portion at least containing the oxidation catalyst in the oxidative exothermic layer to the portion at least containing the thermally conductive particles in the oxidative exothermic layer, and additionally transferring the heat from the portion containing the thermally conductive particles to the inner reforming layer and the outer reforming layer.

11. An oxidative autothermal reforming method according to claim 7, wherein the mixture of the hydrocarbon or aliphatic alcohol and steam is a mixture of steam and at least one selected from the group consisting of gas oil, naphtha, kerosene and gasoline.

* * * * *